US009532353B2

(12) United States Patent
Yang et al.

(10) Patent No.: US 9,532,353 B2
(45) Date of Patent: *Dec. 27, 2016

(54) METHOD AND APPARATUS FOR TRANSMITTING CONTROL INFORMATION IN WIRELESS COMMUNICATION SYSTEM

(71) Applicant: LG ELECTRONICS INC., Seoul (KR)

(72) Inventors: Suckchel Yang, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/829,401

(22) Filed: Aug. 18, 2015

(65) Prior Publication Data

US 2015/0358948 A1    Dec. 10, 2015

Related U.S. Application Data

(63) Continuation of application No. 14/123,475, filed as application No. PCT/KR2012/005972 on Jul. 26, 2012, now Pat. No. 9,144,070.

(Continued)

(51) Int. Cl.
*H04W 72/04* (2009.01)
*H04W 88/04* (2009.01)
(Continued)

(52) U.S. Cl.
CPC ............ *H04W 72/042* (2013.01); *H04L 5/001* (2013.01); *H04L 5/0007* (2013.01); *H04L 5/0053* (2013.01);
(Continued)

(58) Field of Classification Search
None
See application file for complete search history.

(56) References Cited

U.S. PATENT DOCUMENTS

2011/0075624 A1    3/2011  Papasakellariou et al.
2011/0269492 A1*  11/2011  Wang .................... H04L 5/003
                                                              455/509
(Continued)

FOREIGN PATENT DOCUMENTS

KR    10-2009-0083269 A    8/2009
KR    10-2010-0123650 A   11/2010
(Continued)

OTHER PUBLICATIONS

Samsung, "PDCCH Extension to Support Operation with Cross-Carrier Scheduling", 3GPP TSG RAN WG1 #60, R1-101142, San Francisco, USA, Feb. 22-26, 2010, 2 pages.

*Primary Examiner* — Min Jung
(74) *Attorney, Agent, or Firm* — Birch, Stewart, Kolasch & Birch, LLP

(57) ABSTRACT

A method for operating a user equipment (UE) in a wireless communication system, and the UE therefore are discussed. The method according to one embodiment includes receiving a subframe including a plurality of orthogonal frequency division multiplexing (OFDM) symbols; and monitoring a plurality of search spaces configured on the subframe so as to receive control information indicated to the UE. The plurality of search spaces are allocated in a first control channel region or a second control channel region, the first control channel region including one or more consecutive OFDM symbols and the second control channel region including one or more consecutive OFDM symbols not overlapped with the first control channel region. Search spaces corresponding to Control Channel Element (CCE) aggregation level 4 and 8 are allocated to the first control channel region, if a UE is configured for Enhanced-Physical Control Channel (E-PDCCH) monitoring in the subframe.

12 Claims, 16 Drawing Sheets

*Each search space is allocated to L-PDCCH region and/or E-PDCCH region according to predetermined condition

Related U.S. Application Data

(60) Provisional application No. 61/554,481, filed on Nov. 1, 2011, provisional application No. 61/511,964, filed on Jul. 26, 2011.

(51) Int. Cl.
  *H04L 5/00* (2006.01)
  *H04W 88/02* (2009.01)
  *H04W 72/00* (2009.01)

(52) U.S. Cl.
  CPC ............ *H04W 88/04* (2013.01); *H04L 5/0094* (2013.01); *H04W 72/00* (2013.01); *H04W 72/04* (2013.01); *H04W 88/02* (2013.01)

(56) References Cited

U.S. PATENT DOCUMENTS

| | | | |
|---|---|---|---|
| 2011/0292891 A1* | 12/2011 | Hsieh | ............... H04L 5/001 370/329 |
| 2012/0063349 A1 | 3/2012 | Kim et al. | |
| 2012/0063351 A1 | 3/2012 | Kim et al. | |
| 2012/0201230 A1 | 8/2012 | Wang et al. | |
| 2013/0010714 A1 | 1/2013 | Kim et al. | |
| 2013/0039284 A1 | 2/2013 | Marinier et al. | |
| 2013/0058240 A1* | 3/2013 | Kim | ............... H04L 5/0007 370/252 |
| 2013/0142142 A1* | 6/2013 | McBeath | ............ H04W 72/042 370/329 |
| 2014/0016596 A1 | 1/2014 | Kim et al. | |
| 2014/0050192 A1 | 2/2014 | Kim et al. | |
| 2014/0056188 A1 | 2/2014 | Yang et al. | |
| 2014/0086188 A1 | 3/2014 | Hoymann et al. | |
| 2014/0105154 A1 | 4/2014 | Yang et al. | |
| 2014/0161088 A1 | 6/2014 | Seo et al. | |
| 2014/0293942 A1 | 10/2014 | Kang et al. | |
| 2015/0289239 A1* | 10/2015 | Saito | ............... H04L 5/001 370/329 |

FOREIGN PATENT DOCUMENTS

| | | |
|---|---|---|
| KR | 10-2011-0082485 A | 7/2011 |
| WO | WO 2010/131929 A2 | 11/2010 |
| WO | WO 2011/044755 A1 | 4/2011 |

\* cited by examiner

FIG. 2
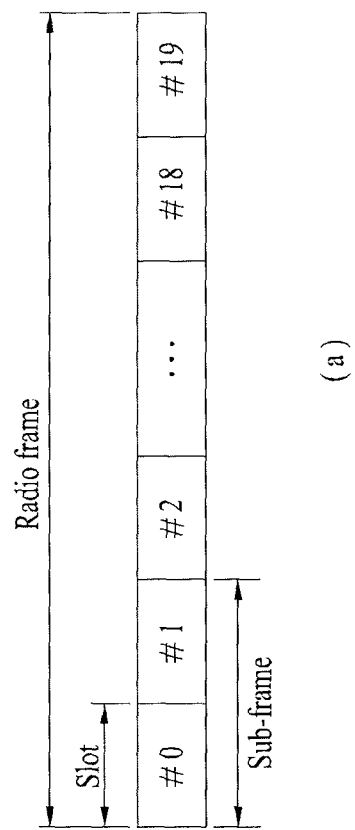
(a)
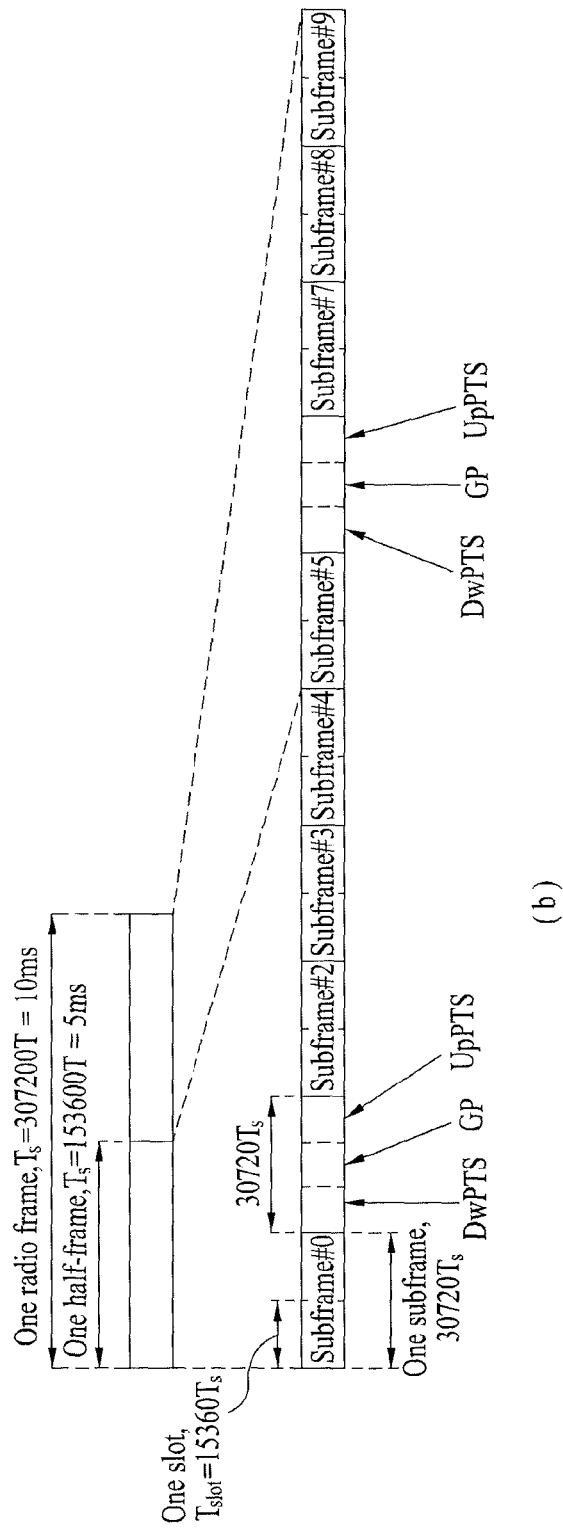
(b)

FIG. 12

| CCE aggregation level | Number of (E-)PDCCH candidates | |
|---|---|---|
| | L-PDCCH region | E-PDCCH region |
| 1 | X1 | 0 |
| 2 | X2 | 0 |
| 4 | 0 | X4 |
| 8 | 0 | X8 |

(a)

| CCE aggregation level | Number of (E-)PDCCH candidates | |
|---|---|---|
| | L-PDCCH region | E-PDCCH region |
| 1 | 0 | X1 |
| 2 | 0 | X2 |
| 4 | X4 | 0 |
| 8 | X8 | 0 |

| CCE aggregation level | Number of (E-)PDCCH candidates | |
|---|---|---|
| | L-PDCCH region | E-PDCCH region |
| 1 | X1,1 | X1,2 |
| 2 | X2,1 | X2,2 |
| 4 | X4,1 | X4,2 |
| 8 | X8,1 | X8,2 |

FIG. 14

| DCI format | Number of (E-)PDCCH candidates ||
|---|---|---|
| | L-PDCCH region | E-PDCCH region |
| DL-dedicated | 0 | A |
| UL-dedicated | B | 0 |
| DL/UL-common | C | 0 |

(a)

| DCI format | Number of (E-)PDCCH candidates ||
|---|---|---|
| | L-PDCCH region | E-PDCCH region |
| DL-dedicated | 0 | A |
| UL-dedicated | 0 | B |
| DL/UL-common | C | 0 |

(b)

METHOD AND APPARATUS FOR TRANSMITTING CONTROL INFORMATION IN WIRELESS COMMUNICATION SYSTEM

CROSS-REFERENCE TO RELATED APPLICATIONS

This application is a Continuation of copending U.S. application Ser. No. 14/123,475, filed on Dec. 2, 2013, which is the National Stage of PCT International Application No. PCT/KR2012/005972 on Jul. 26, 2012, which claims the benefit under 35 U.S.C. §119(e) to U.S. Provisional Application Nos. 61/554,481, filed on Nov. 1, 2011 and 61/511,964 filed on Jul. 26, 2011, all of which are hereby expressly incorporated by reference into the present application.

BACKGROUND OF THE INVENTION

Field of the Invention

The present invention relates to a wireless communication system and, more specifically, to a method and apparatus for transmitting control information. The wireless communication system supports carrier aggregation (CA).

Discussion of the Related Art

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

SUMMARY OF THE INVENTION

An object of the present invention devised to solve the problem lies in a method for efficiently transmitting control information in a wireless communication system and an apparatus for the same. Another object of the present invention is to provide a channel format, a resource allocation scheme and a signal processing method for efficiently transmitting control information and an apparatus for the same. Another object of the present invention is to provide a method for efficiently allocating resources for transmitting control information and an apparatus for the same.

The technical problems solved by the present invention are not limited to the above technical problems and those skilled in the art may understand other technical problems from the following description.

The object of the present invention can be achieved by providing a method for receiving a downlink signal by UE in a wireless communication system, the method including: receiving a subframe including a plurality of orthogonal frequency division multiplexing (OFDM) symbols; monitoring a plurality of search spaces configured on the subframe so as to receive a physical downlink control channel (PDCCH) indicated to the UE; and when the PDCCH indicated to the UE is detected, performing an operation in accordance with the detected PDCCH, wherein each of the search spaces is configured in at least one of a first resource region and a second resource region according to a predetermined condition, and the first resource region and the second resource region are separated by a specific OFDM symbol as a boundary in time domain.

In another aspect of the present invention, provided herein is a UE for use in a wireless communication system, including: an radio frequency (RF) unit; and a processor, wherein the processor is configured to receive a subframe including a plurality of OFDM symbols, to monitor a plurality of search spaces configured on the subframe so as to receive a PDCCH indicated to the UE and, when the PDCCH indicated to the UE is detected, to perform an operation in accordance with the detected PDCCH, wherein each of the search spaces is configured in at least one of a first resource region and a second resource region according to a predetermined condition, and the first resource region and the second resource region are separated by a specific OFDM symbol as a boundary in time domain.

A search space for a plurality of PDCCH candidates corresponding to a CCE aggregation level lower than a first value may be configured in the first resource region and a search space for a plurality of PDCCH candidates corresponding to a CCE aggregation level higher than a second value may be configured in the second resource region.

A plurality of PDCCH candidates at each CCE aggregation level may be divided into two candidate sets, wherein a search space for a first candidate set of the two candidate sets is configured in the first resource region and a search space for a second candidate set is configured in the second resource region.

A search space for a first type DCI format may be configured in the first resource region and a search space for a second type DCI format may be configured in the second resource region, wherein the first type DCI format includes a DCI format used for uplink scheduling and the second type DCI format includes a DCI format used for downlink scheduling only.

The first resource region may be located in the front part of the subframe on the basis of the specific OFDM symbol and the second resource region may be located in the rear part of the subframe on the basis of the specific OFDM symbol, wherein the second resource region is multiplexed with a resource for a downlink shared channel according to FDM.

A basic resource unit of the first resource region may be a resource element group (REG) and a basic resource unit of the second resource region may be a resource block (RB).

The OFDM symbol may be indicated through a PCFICH signal or RRC signaling.

According to the present invention, it is possible to efficiently transmit control information in a wireless communication system. Furthermore, it is possible to provide a channel format, a resource allocation scheme and a signal processing method for efficiently transmitting control information. In addition, it is possible to efficiently allocate resources for transmitting control information.

The effects of the present invention are not limited to the above-described effects and other effects which are not described herein will become apparent to those skilled in the art from the following description.

BRIEF DESCRIPTION OF DRAWINGS

The accompanying drawings, which are included to provide a further understanding of the invention, illustrate embodiments of the invention and together with the description serve to explain the principle of the invention. In the drawings:

FIG. 2 illustrates a radio frame structure;

FIGS. 12, 13 and 14 illustrate search space (SS) distribution methods according to embodiments of the present invention;

DETAILED DESCRIPTION OF THE INVENTION

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/ Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is evolved from 3GPP LTE. While the following description is given, centering on 3GPP LTE/LTE-A for clarity, this is purely exemplary and thus should not be construed as limiting the present invention.

In a wireless communication system, a UE receives information from a BS on downlink (DL) and transmits information to the BS on uplink (UL). Information transmitted/received between the UE and BS includes data and various types of control information, and various physical channels are present according to type/purpose of information transmitted/received between the UE and BS.

Figure 1:
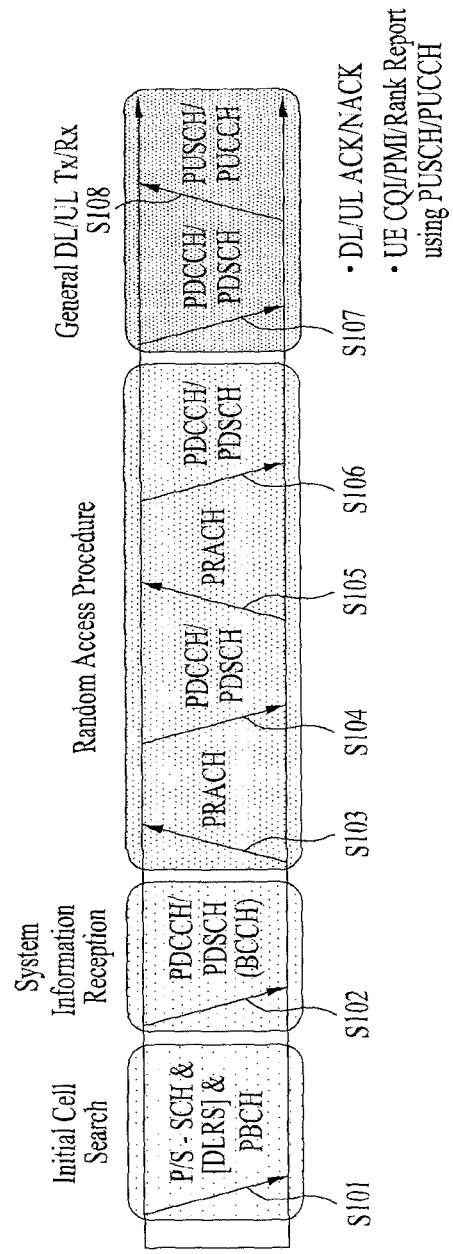
FIG. 1 illustrates physical channels used in a 3GPP LTE system as an exemplary wireless communication system and a signal transmission method using the same.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Here, control information transmitted from the UE to the BS is called uplink control information (UCI). The UCI may include a hybrid automatic repeat and request (HARQ) acknowledgement (ACK)/negative-ACK (HARQ ACK/NACK) signal, a scheduling request (SR), channel state information (CSI), etc. The CSI includes a channel quality indicator (CQI), a precoding matrix index (PMI), a rank indicator (RI), etc. While the UCI is transmitted through a PUCCH in general, it may be transmitted through a PUSCH when control information and traffic data need to be simultaneously transmitted. The UCI may be aperiodically transmitted through a PUSCH at the request/ instruction of a network.

FIG. 2 illustrates a radio frame structure. In a cellular OFDM wireless packet communication system, uplink/ downlink data packet transmission is performed on a sub-frame-by-subframe basis. A subframe is defined as a predetermined time interval including a plurality of OFDM symbols. 3GPP LTE supports a type-1 radio frame structure applicable to FDD (Frequency Division Duplex) and a type-2 radio frame structure applicable to TDD (Time Division Duplex).

FIG. 2(*a*) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 5 subframes, DwPTS (downlink pilot timeslot), GP (guard period), and UpPTS (uplink pilot timeslot). A subframe includes 2 slots. DwPTS is used for initial cell search, synchronization or channel estimation in a UE. UpPTS is used for channel estimation in a BS and UL transmission synchronization acquisition in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
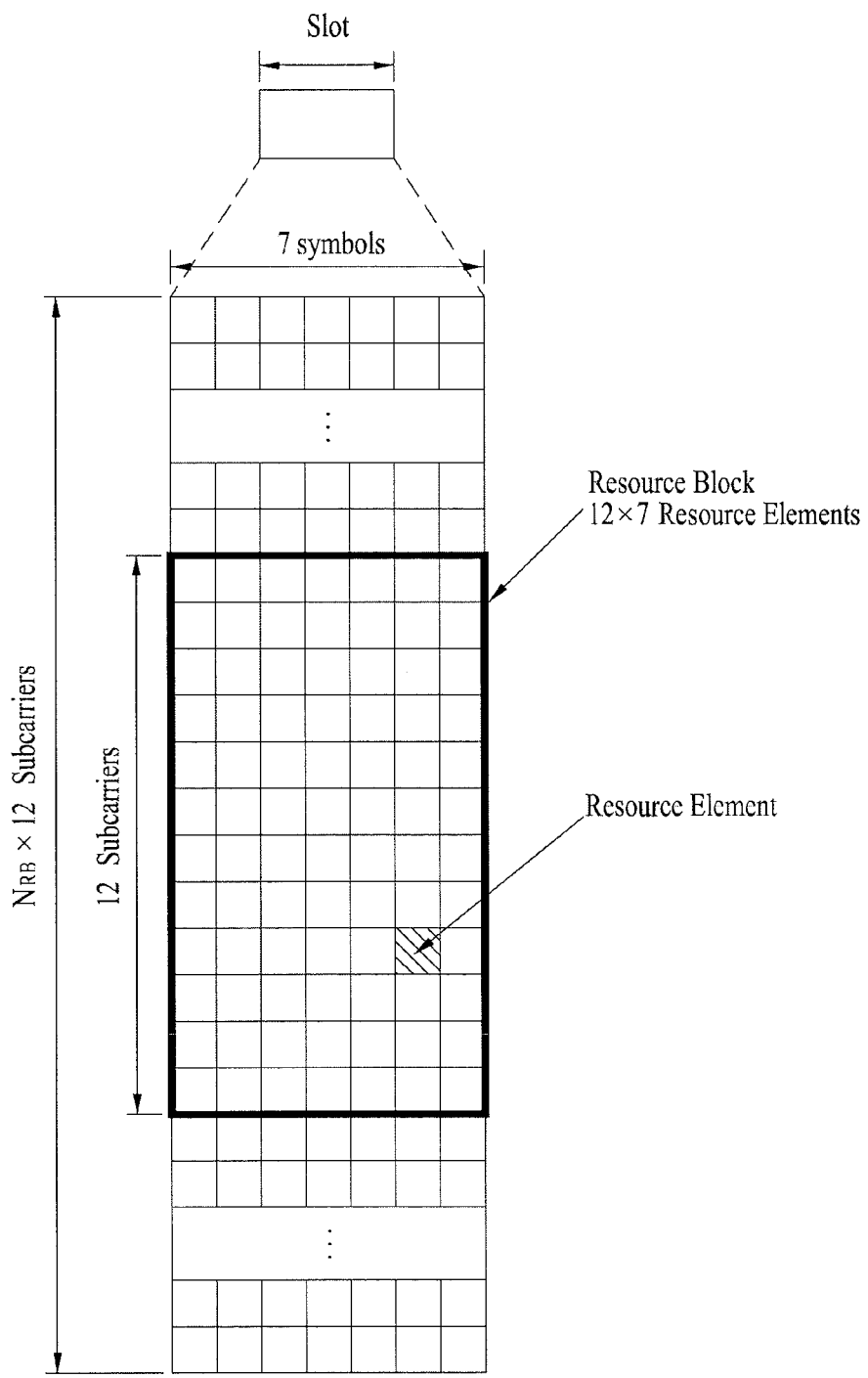
FIG. 3 illustrates a resource grid of a downlink slot.

FIG. 3 illustrates a resource grid of a downlink slot.

Referring to FIG. 3, a downlink slot includes a plurality of OFDM symbols in the time domain. One downlink slot may include 7 OFDM symbols, and one resource block (RB) may include 12 subcarriers in the frequency domain. However, the present invention is not limited thereto. Each element on the resource grid is referred to as a resource element (RE). One RB includes 12×7 REs. The number $N_{RB}$ of RBs included in the downlink slot depends on a downlink transmit bandwidth. The structure of an uplink slot may be same as that of the downlink slot.

Figure 4:
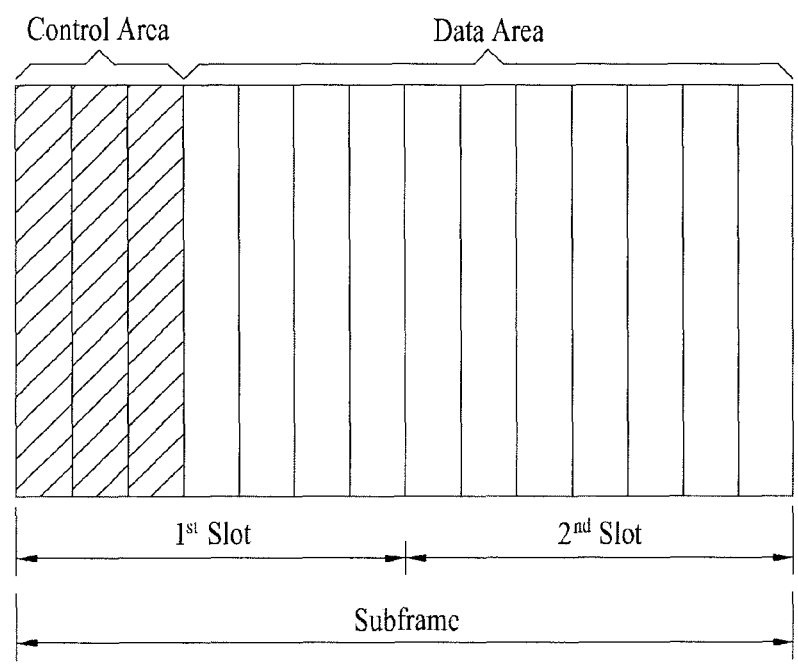
FIG. 4 illustrates a downlink subframe structure.

FIG. 4 illustrates a downlink subframe structure.

Referring to FIG. 4, a maximum of 3 (4) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PH-ICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UIE group.

Control information transmitted through a PDCCH is referred to as DCI. Formats 0, 3, 3A and 4 for uplink and formats 1, 1A, 1B, 1C, 1D, 2, 2A, 2B and 2C for downlink are defined as DCI formats. Information field types, the number of information fields and the number of bits of each information field depend on DCI format. For example, the DCI formats selectively include information such as hopping flag, RB allocation, MCS (modulation coding scheme), RV (redundancy version), NDI (new data indicator), TPC (transmit power control), HARQ process number, PMI (precoding matrix indicator) confirmation as necessary. A DCI format can be used to transmit control information of two or more types. For example, DCI format 0/1A is used to carry DCI format 0 or DCI format 1, which are discriminated from each other by a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

A PDCCH carries a message corresponding to DCI (downlink control information) and the DCI includes resource allocation and control information for a UE or a UE group. In general, a plurality of PDCCHs can be transmitted in a subframe. Each PDCCH is transmitted using one or more CCEs each of which corresponds to 9 sets of 4 REs. 4 REs are referred to as a resource element group (REG). 4 QPSK symbols are mapped to an REG. An RE allocated to a reference signal is not included in an REG and thus the number of REGs in an OFDM symbol depends on presence or absence of a cell-specific reference signal. The concept of REG (i.e. mapping on a group basis, each group including 4 REs) is used for other downlink control channels (PCFICH and PHICH). That is, the REG is used as a basic resource unit of a control region. 4 PDCCH formats are supported as shown in Table 1.

TABLE 1

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify decoding, transmission of a PDCCH having a format composed of n CCEs can be started using a multiple of n CCEs. The number of CCEs used to transmit a specific PDCCH is determined by a BS according to channel quality. For example, in case of a PDCCH assigned to a UE having a high-quality downlink channel (e.g. a channel close to the BS), only one CCE can be used to transmit the PDCCH. However, in the case of a PDCCH assigned to a UE having a poor channel state (e.g. close to a cell edge), 8 CCEs can be used for PDCCH transmission in order to obtain sufficient robustness. In addition, a power level of the PDCCH can be controlled according to channel quality.

In LTE, positions of CCEs in a limited set in which a PDCCH can be disposed for each UE are defined. The positions of CCEs in a limited set in which a UE can detect a PDCCH allocated thereto are referred to as the "search space (SS)". In LTE, the size of the search space depends upon the PDCCH format. In addition, UE-specific and UE-common search spaces are separately defined. The UE-specific search space is set on a UE basis, whereas the UE-common search space is known to all UEs. The UE-specific and UE-common search spaces may overlap for a predetermined UE. If a UE has a considerably small search space, no CCE is left when CCEs are allocated in the search space. Accordingly, a BS may not detect CCEs through which a PDCCH will be transmitted to the UE in a predetermined subframe, which is referred to as blocking. To minimize possibility that blocking continues in the next subframe, a UE-specific hopping sequence is applied to the start point of the UE-specific search space.

Sizes of the UE-specific and UE-common search spaces are shown in Table 2.

TABLE 2

| PDCCH format | Number of CCEs (n) | Number of candidates in common SS | Number of candidates in UE-specific SS |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes, a UE is not required to simultaneously search for all defined DCI formats. In general, the UE searches for formats 0 and 1A at all times in the UE-specific search space. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the UE-common search space. Furthermore, the UE may be set to search for format 3 or 3A. Formats 3 and 3A have the same size as formats 0 and 1A and may be discriminated from each other by scrambling CRC with different (common) identifiers rather than a UE-specific identifier.

Transmission Mode
Transmission mode 1: Transmission from a single BS antenna port
Transmission mode 2: Transmit diversity
Transmission mode 3: Open-loop spatial multiplexing
Transmission mode 4: Closed-loop spatial multiplexing
Transmission mode 5: Multi-user MIMO
Transmission mode 6: Closed-loop rank-1 precoding
Transmission mode 7: Transmission using UE-specific reference signals
DCI Format
Format 0: Resource grants for the PUSCH transmissions (uplink)
Format 1: Resource assignments for single codeword PDSCH transmissions (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments Considering the above description, the UE needs to perform a maximum of 44 blind decoding operations per subframe. Since checking the same message with different CRC values requires only small additional computational complexity, checking the same message using different CRC values is not included in the number of blind decoding operations.

Figure 5:
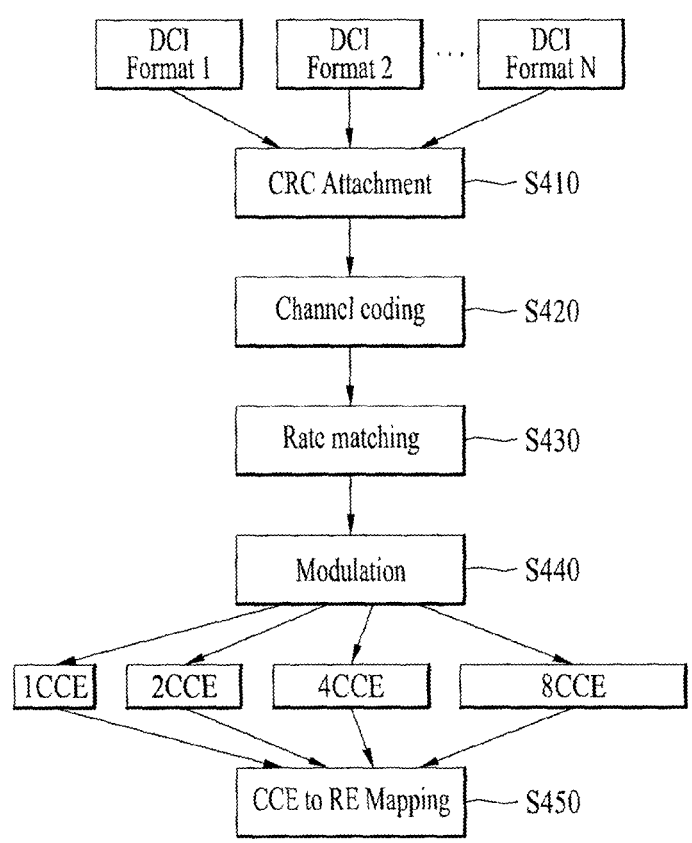
FIG. 5 illustrates a procedure through which a BS configures a PDCCH.

FIG. 5 is a flowchart illustrating a procedure through which a BS configures a PDCCH.

Referring to FIG. 5, the BS generates control information according to DCI format. The BS can select a DCI format from a plurality of DCI formats (DCI formats 1, 2, . . . , N) according to control information to be transmitted to a UE. In step S410, a CRC (cyclic redundancy check) for error detection is attached to control information generated based on each DCI format. The CRC is masked with an identifier (e.g. RNTI) according to an owner or usage of a PDCCH. In other words, the PDCCH is CRC-scrambled with the identifier (e.g. RNTI).

Table 3 shows examples of identifiers masking the PDCCH.

TABLE 3

| Type | Identifier | Description |
|---|---|---|
| UE-specific | C-RNTI, temporary C-RNTI, semi-persistent C-RNTI | Used for unique identification of UE |
| Common | P-RNTI | Used for paging messages |
|  | SI-RNTI | Used for system information |
|  | RA-RNTI | Used for random access response |

When C-RNTI, temporary C-RNTI or semi-persistent C-RNTI is used, the PDCCH carries control information for the corresponding UE. When other RNTIs are used, the PDCCH carries common control information received by all UEs in a cell. In step S420, the CRC-attached control information is channel-coded, generating coded data (codeword). In step S430, rate matching based on a CCE aggregation level allocated to a PDCCH format is performed. In step S440, the coded data is modulated to generate modulated symbols. Modulated symbols constituting a PDCCH may have one of CCE aggregation levels of 1, 2, 4 and 8. In step S450, the modulated symbols are mapped to physical REs.

Figure 6:
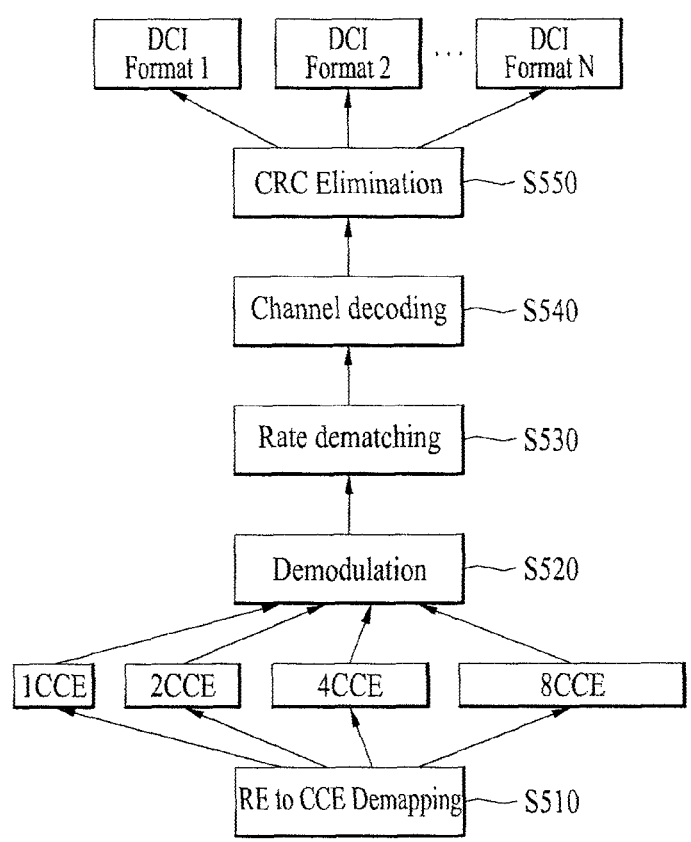
FIG. 6 illustrates a procedure through which a UE processes a PDCCH.

FIG. 6 is a flowchart illustrating a procedure through which the UE processes the PDCCH.

Referring to FIG. 6, the UE demaps the physical REs to CCEs in step S510. The UE performs demodulation for each CCE aggregation level in step S520 since the UE does not know a CCE aggregation level at which the UE needs to receive the PDCCH. The UE performs rate dematching on the demodulated data in step S530. The UE carries out rate dematching for each DCI format (or DCI payload size) since the UE does not know a DCI format (or DCI payload size) corresponding to information that needs to be received by the UE. The UE performs channel decoding on the rate-dematched data according to coding rate and detects whether an error is generated by checking the CRC in step S540. When no error is generated, the UE detects the PDCCH corresponding thereto. If an error is generated, the UE continuously performs blind decoding for other CCE aggregation levels or other DCI formats (or DCI payload sizes). Upon detection of the PDCCH, the UE removes the CRC from the decoded data and acquires the control information in step S550.

A plurality of PDCCHs for a plurality of UEs can be transmitted in a control region of the same subframe. The BS does not provide information about the position of a PDCCH in the control region to a UE corresponding to the PDCCH. Accordingly, the UE searches the subframe for the PDCCH thereof by monitoring a set of PDCCH candidates. Here, monitoring refers to a process through which the UE attempts to decode received PDCCH candidates according to each DCI format. Monitoring is also referred to as blind detection. The UE simultaneously performs identification of the PDCCH transmitted thereto and decoding of control information transmitted through the PDCCH using blind detection. For example, when the PDCCH is de-masked with C-RNTI, the UE detects the PDCCH thereof if no CRC error is generated.

To reduce blind detection overhead, the number of DCI formats is defined as smaller than the number of types of control information transmitted using the PDCCH. DCI formats include different information fields. Information field type, the number of information fields and the number of bits of each information field vary according to DCI format. In addition, the size of control information matched to a DCI format depends on the DCI format. A DCI format can be used to transmit two or more types of control information.

Table 4 shows examples of control information transmitted using DCI format 0. The bit size of each information field is exemplary and is not limited to Table 4.

TABLE 4

| Information field | Bit(s) |
| --- | --- |
| (1) Flag for discriminating between format 0 and format 1A | 1 |
| (2) Hopping flag | 1 |
| (3) Resource block allocation and hopping resource allocation | $\lceil \log_2(N_{RB}^{UL}(N_{RB}^{UL}+1)/2) \rceil$ |

TABLE 4-continued

| Information field | Bit(s) |
| --- | --- |
| (4) Modulation and coding scheme and redundancy version | 5 |
| (5) New data indicator | 1 |
| (6) TPC command for scheduled PUSCH | 2 |
| (7) Cyclic shift for DM RS | 3 |
| (8) UL index (TDD) | 2 |
| (9) CQI request | 1 |

The flag field is an information flag for discriminating between format 0 and format 1A. That is, DCI format 0 and DCI format 1A have the same payload size and are discriminated from each other by flag fields. The bit size of the resource block allocation and hopping resource allocation field may vary according to hopping PUSCH or non-hopping PUSCH. The resource block allocation and hopping resource allocation field for the non-hopping PUSCH provides $\lceil \log_2(N_{RB}^{UL}(N_{R}^{UL}+1)/2) \rceil$ bits for resource allocation of the first slot in an uplink subframe. Here, $N_{RB}^{UL}$ denotes the number of RBs included in an uplink slot and depends upon an uplink transmission bandwidth set in a cell. Accordingly, the payload size of DCI format 0 can depend upon uplink bandwidth. DCI format 1A includes an information field for PDSCH allocation. The payload size of DCI format 1A can depend upon downlink bandwidth. DCI format 1A provides a reference information bit size for DCI format 0. Accordingly, DCI format 0 is padded with '0' until the payload size of DCI format 0 becomes identical to the payload size of DCI format 1A when the number of information bits of DCI format 0 is less than the number of information bits of DCI format 1A. The added '0' is filled in a padding field of DCI format.

Figure 7:
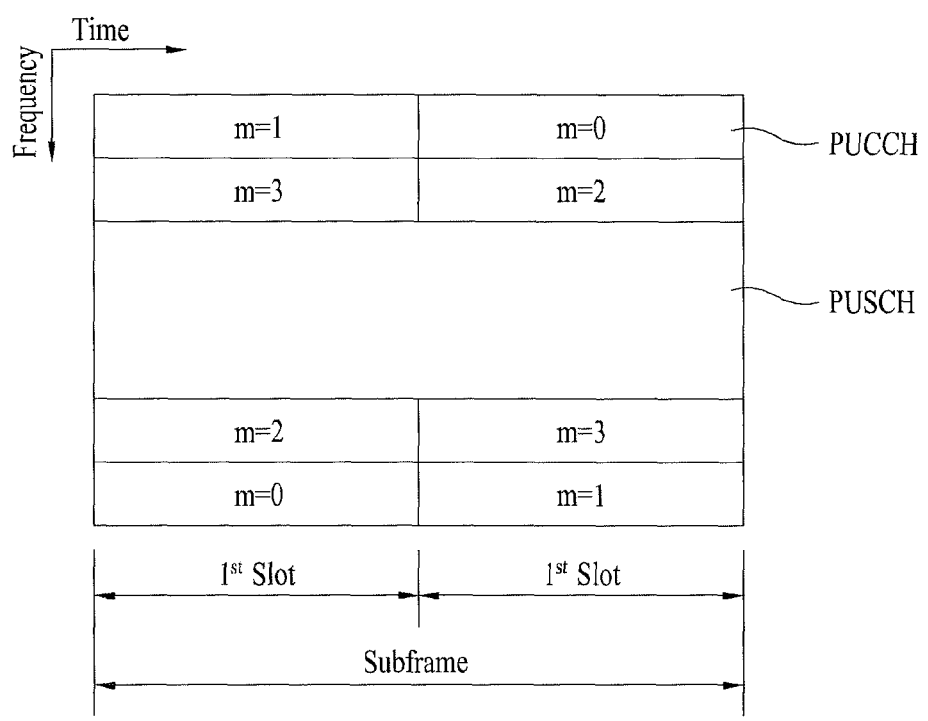
FIG. 7 illustrates an uplink subframe structure.

FIG. 7 illustrates an uplink subframe structure used in LTE.

Referring to FIG. 7, an uplink subframe includes a plurality of (e.g. 2) slots. A slot may include different numbers of SC-FDMA symbols according to CP length. For example, a slot can include 7 SC-FMDA symbols in the case of normal CP. The uplink subframe is divided into a control region and a data region in the frequency domain. The data region is allocated a PUSCH and used to carry a data signal such as audio data. The control region is allocated a PUCCH and used to carry control information. The PUCCH includes an RB pair (e.g. m=0, 1, 2, 3) located at both ends of the data region in the frequency domain and hopped in a slot boundary. The control information includes HARQ ACK/NACK, CQI (channel quality information), PMI (precoding matrix indicator), RI (rank indicator), etc.

Figure 8:
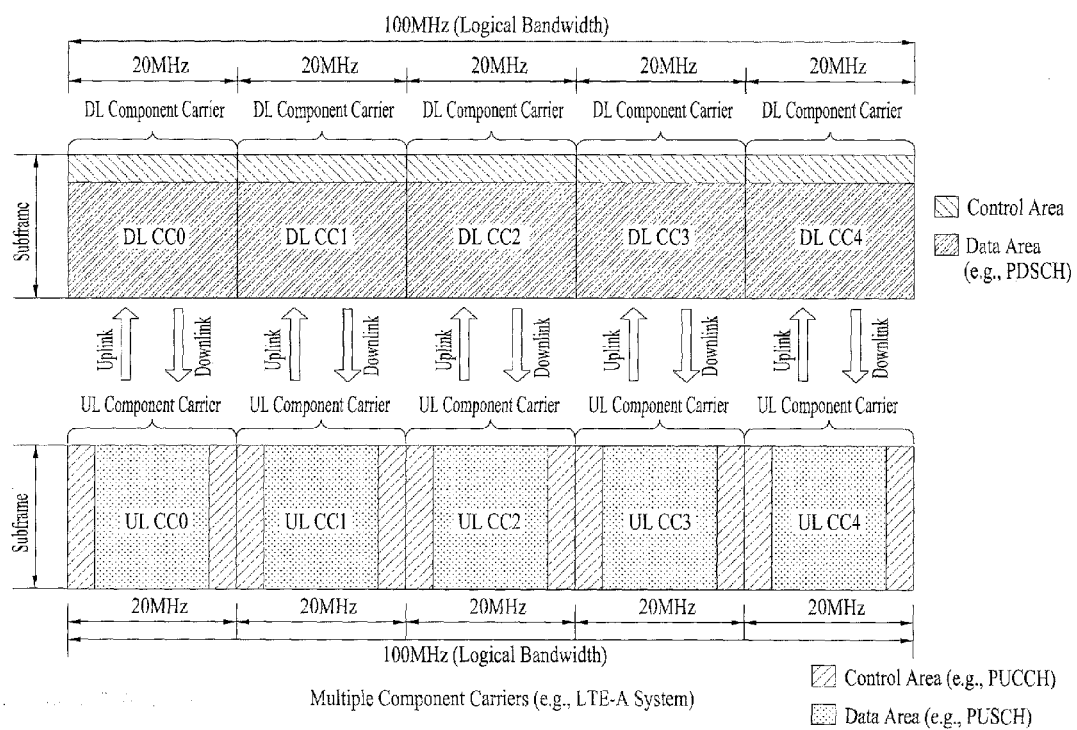
FIG. 8 illustrates a CA (carrier aggregation) communication system.

FIG. 8 illustrates a carrier aggregation (CA) communication system.

Referring to FIG. 8, a plurality of uplink/downlink component carriers (CCs) can be aggregated to support a wider uplink/downlink bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC can be referred to as a primary CC (PCC) and other CCs can be referred to as secondary CCs (SCCs). For example, when cross-carrier scheduling (or cross-CC scheduling) is applied, a PDCCH for downlink allocation can be transmitted through DL CC#0 and a PDSCH corresponding to the PDCCH can be transmitted through DL CC#2. The term "component carrier" can be replaced by other equivalent terms (e.g. carrier, cell, etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.
No CIF
CIF enabled: a PDCCH on a DL CC can be used to allocate a PDSCH or PUSCH resource on a specific DL/UL CC from among a plurality of aggregated DL/UL CCs using the CIF.
LTE DCI format extended to have the CIF
CIF corresponds to a fixed x-bit field (e.g. x=3) (when the CIF is set).
CIF position is fixed irrespective of DCI format size (when the CIF is set).

When the CIF is present, the BS can allocate a PDCCH monitoring DL CC (set) to reduce BD complexity of the UE. For PDSCH/PUSCH scheduling, a UE can detect/decode a PDCCH only in the corresponding DL CC. The BS can transmit the PDCCH only through the monitoring DL CC (set). The monitoring DL CC set can be set UE-specifically, UE-group-specifically or cell-specifically.

Figure 9:
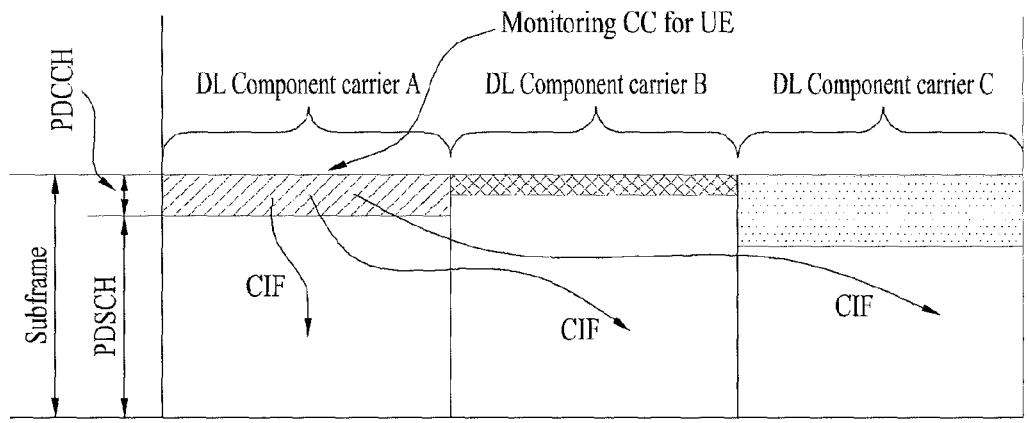
FIG. 9 illustrates cross-carrier scheduling.

FIG. 9 illustrates a case in which 3 DL CCs are aggregated and DL CC A is set to a monitoring DL CC. When the CIF is disabled, each DL CC can carry a PDCCH that schedules a PDSCH of the DL CC without the CIF according to LTE PDCCH rules. When the CIF is enabled through higher layer signaling, DL CC A can carry not only a PDSCH thereof but also PDSCHs of other DL CCs using the CIF. DL CC B and DL CC C which are not set to monitoring DL CCs do not carry a PDCCH. Here, the term "monitoring DL CC" can be used interchangeably with terms such as "monitoring carrier", "monitoring cell". "scheduling carrier", "scheduling cell", "serving carrier", "serving cell", etc. A DL CC on which a PDSCH corresponding to a PDCCH is transmitted and a UL CC on which a PUSCH corresponding to a PUCCH is transmitted are referred to as scheduled carriers, scheduled cells, etc.

In 3GPP LTE/LTE-A, an FDD DL carrier and TDD DL subframe use first n OFDM symbols of the subframe to transmit physical channels for control information transmission, such as a PDCCH, PHICH, PCFICH, etc. and use other OFDM symbols for PDSCH transmission. The number of symbols used for control channel transmission in each subframe is signaled to the UE dynamically through a physical channel such as a PCFICH or semi-statically through RRC signaling. The value n can be set to one to a maximum of four symbols according to subframe characteristics and system characteristics (FDD/TDD, system band, etc.). A PDCCH, a physical channel for DL/UL scheduling and control information, is transmitted through limited OFDM symbols in LTE. Accordingly, introduction of an enhanced PDCCH (E-PDCCH) that is freely multiplexed with a PDSCH according to FDM/TDM is considered.

Figure 10:
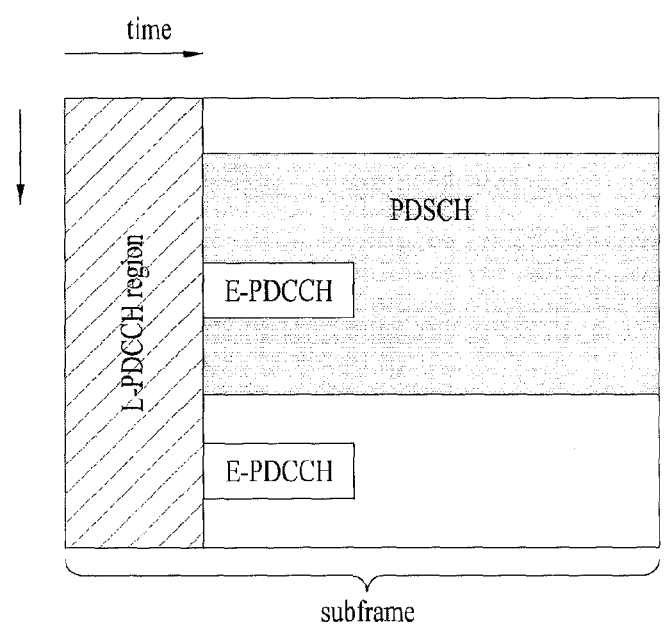
FIG. 10 illustrates an example of allocating a PDCCH to a data region of a subframe.

FIG. 10 illustrates an example of allocating a downlink physical channel to a subframe.

Referring to FIG. 10, a PDCCH (legacy PDCCH) according to LTE/LTE-A can be allocated to a control region (refer to FIG. 4) of a subframe. In FIG. 10, an L-PDCCH region represents a region to which the legacy PDCCH can be assigned. The L-PDCCH region may refer to a control region, a control channel resource region (i.e. CCE resource) to which a PDCCH can be actually allocated in the control region or a PDCCH search space. A PDCCH can be additionally allocated to a data region (e.g. a resource region for a PDSCH) (refer to FIG. 4). The PDCCH allocated to the data region is referred to as an E-PDCCH. FIG. 10 illustrates a case in which a single E-PDCCH is present in a single slot. However, this is exemplary and the E-PDCCH can be present per subframe (i.e. for two slots).

A description will be given of a method for allocating and operating a resource for a downlink control channel using a data region (e.g. PDSCH) of a subframe with reference to the attached drawings. While the following description focuses on the relationship between a BS and UE, the present invention is applicable to a BS and a relay or a relay and a UE in an identical or similar manner. Accordingly, a BS and UE can be replaced by a BS and a relay or a relay and UE in the following description. The relay and UE can be generalized as a receiver in terms of signal reception. When the relay operates as a receiver, the E-PDCCH can be replaced by a relay-PDCCH (R-PDCCH).

The E-PDCCH will now be described in detail. The E-PDCCH carries DCI. DCI is illustrated in Table 1. For example, the E-PDCCH can carry downlink scheduling information and uplink scheduling information. An E-PDCCH/PDSCH transmission/reception process and an E-PDCCH/PUSCH transmission/reception process are identical/similar to steps S107 and S108 of FIG. 1. That is, UE can receive an E-PDCCH and receive data/control information through a PDSCH corresponding to the E-PDCCH. In addition, the UE can receive an E-PDCCH and transmit data/control information through a PUSCH corresponding to the E-PDCCH. E-PDCCH transmission processing (e.g. channel coding, interleaving, multiplexing, etc.) can be performed using procedures (refer to FIGS. 5 and 6) defined in LTE and modified as necessary.

LTE adopts a method of reserving a PDCCH candidate region (referred to as a PDCCH search space hereinafter) within a control region and transmitting a PDCCH of a specific UE in a part of the reserved PDCCH candidate region. Accordingly, the UE can acquire the PDCCH thereof within the PDCCH search space through blind detection. Similarly, an E-PDCCH can be transmitted through a whole reserved resource or part of the reserved resource.

Figure 11:
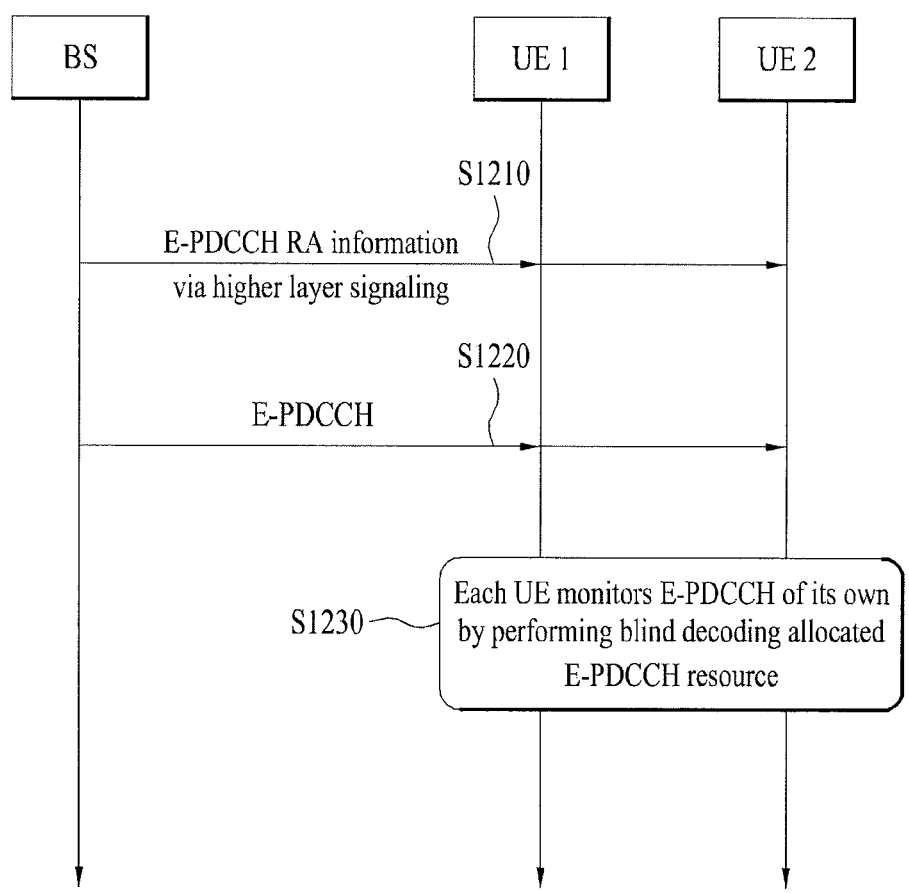
FIG. 11 illustrates a procedure of allocating resources for an E-PDCCH and receiving a PDSCH.

FIG. 11 illustrates a procedure of allocating a resource for an E-PDCCH and receiving the E-PDCCH.

Referring to FIG. 11, the BS transmits E-PDCCH resource allocation (RA) information to the UE (S1210). The E-PDCCH RA information can include RB (or VRB (virtual resource block)) allocation information. The RB allocation information can be provided on an RB basis or RBG (resource block group) basis. An RBG includes two or more contiguous RBs. The E-PDCCH RA information can be transmitted using higher layer (e.g. RRC) signaling. Here, the E-PDCCH RA information is used to reserve an E-PDCCH resource (region). The BS transmits an E-PDCCH to the UE (S1220). The E-PDCCH can be transmitted in part of the E-PDCCH resource (e.g. M RBs) reserved in step S1210 or in the entire E-PDCCH resource. Accordingly, the UE monitors a resource (region) (referred to as an E-PDCCH search space or simply search space) in which the E-PDCCH can be transmitted (S1230). The E-PDCCH search space can be provided as part of the RB set allocated in step S1210. Here, monitoring involves blind decoding of a plurality of E-PDCCH candidates in the search space.

Scheduling restriction due to control channel resource limitations of an L-PDCCH region by additionally securing a control channel resource through an E-PDCCH. For this, a method of operating a control channel by semi-statically determining which one of L-PDCCH or E-PDCCH is applied to each UE through RRC signaling according to control channel load has been considered. When this method is employed, DL/UL scheduling using PDSCH regions as E-PDCCHs for specific UE(s) needs to be performed in order to reduce RRC signaling overhead even though sufficient available L-PDCCH regions can be secured since control channel load is relatively low. In this case, a degree of freedom of PDSCH scheduling of UE may decrease due to other UE for which a DL/UL grant is scheduled through an E-PDCCH or a resource that is not assigned as an E-PDCCH or PDSCH and is discarded may be generated.

A description will be given of a method for distributing and allocating PDCCH search spaces (SSs) to an L-PDCCH region and an E-PDCCH region for efficient utilization of resources in a PDSCH region while having adaptability to control channel load. Here, the L-PDCCH region can refer to a control region, a control channel resource region (i.e. CCE resource) to which a PDCCH can be actually assigned in the control region or a PDCCH SS. Similarly, the E-PDCCH region can refer to a data region (refer to FIG. 4), a control channel resource region (i.e. VRB resource allocated by a higher layer, refer to FIG. 11) to which a PDCCH can actually be allocated in the data region or an E-PDCCH SS.

While the present invention is described based on a CCE aggregation level for PDCCH coding, as defined in 3GPP LTE/LTE-A, the number of PDCCH candidates upon which blind detection (BD) needs to be performed, a DL/UL scheduling DCI format, etc., the present invention can be extended/applied to CCE aggregation levels, the number of PDCCH candidates, DCI formats, which will be added/changed in future.

In the following description, a legacy PDCCH and E-PDCCH can be commonly referred to as a PDCCH unless otherwise mentioned.

The present invention will now be described on the following assumption for convenience of description.

It is assumed that 4 CCE aggregation levels (L=1, 2, 4, 8) are present and the numbers of PDCCH candidates for the 4 CCE aggregation levels are defined as 6, 6, 2 and 2, respectively. In addition, it is assumed that an E-PDCCH corresponding to an aggregation level L is transmitted through L RBs.

It is assumed that a maximum of 3 DCI formats can be set according to transmission mode. For example, the 3 DCI formats include (i) DL-dedicated DCI format (e.g. DCI format 2) used for DL scheduling only, (ii) DL/UL-common DCI format (e.g. DCI format 1/1A) used to selectively perform DL/UL scheduling while sharing one DCI payload size and (iii) UL-dedicated DCI format (e.g. DCI format 4) used for UL scheduling only.

Method 1: SS Distribution According to CCE Aggregation Level

According to this method, SSs can be distributed and allocated to an L-PDCCH region and an E-PDCCH region according to CCE aggregation level (i.e. CCE level). For example, an SS corresponding to a low CCE level (e.g. CCE level=1, 2) can be allocated to the L-PDCCH region and an SS corresponding to a high CCE level (e.g. CCE level=4, 8) can be allocated to the E-PDCCH region. This is because allocation of the SS corresponding to a low CCE level to the L-PDCCH region and allocation of the SS corresponding to a high CCE level to the E-PDCCH region can be useful when control channel load in the L-PDCCH region is considered. Conversely, the SS corresponding to a low CCE level (e.g. CCE level=1, 2) can be allocated to the E-PDCCH region and the SS corresponding to a high CCE level (e.g. CCE level=4, 8) can be allocated to the L-PDCCH region because stabilized PDCCH transmission can be performed in the E-PDCCH region even using a small number of CCE resources through UE-specific DMRS (demodulation resource signal) and/or multi-antenna transmission. A low CCE level and a high CCE level can be determined as needed. In this case, which CCE level corresponds to an SS and which PDCCH region (e.g. L-PDCCH or E-PDCCH) is assigned the SS can be preset through RRC signaling. In addition, which CCE level corresponds to an SS and which PDCCH region (e.g. L-PDCCH or E-PDCCH) is assigned the SS per subframe can be preset through RRC signaling.

Furthermore, for more flexible utilization of CCE resources, the numbers of PDCCH candidates for respective CCE levels can be redistributed such that the number of PDCCH candidates does not exceed a maximum number of BD operations. Then. which CCE level corresponds to an SS and which PDCCH region (e.g. L-PDCCH or E-PDCCH) is assigned the SS can be predetermined through RRC signaling. For example, the numbers of PDCCH candidates at CCE levels of 1, 2, 4 and 8 can be redistributed to 8, 8, 0 and 0 (i.e. X1=X2=8, X4=X8=0), an SS corresponding to CCE level=1 can be allocated to the L-PDCCH region and an SS corresponding to CCE level=2 can be allocated to the E-PDCCH region.

FIG. 12 illustrates an SS distribution and allocation scheme according to the present embodiment. Referring to FIG. 12, an SS can be allocated to the L-PDCCH region or E-PDCCH region according to CCE level. For example, X1=X2=6 and X4=X8=2. In addition, X1=X2=8, X4=X8=0 and X1 and X2 can be allocated to different PDCCH regions, which are not shown.

Method 2: SS Distribution According to PDCCH Candidate Partitioning

According to this method, PDCCH candidates for each CCE level can be divided into 2 sets (e.g. bisected) and SSs for the sets can be allocated to an L-PDCCH region and an E-PDCCH region. For example, SSs for 3, 3, 1 and 1 PDCCH candidates at CCE levels of 1, 2, 4 and 8 can be allocated to the L-PDCCH region and SSs for another 3, 3, 1 and 1 PDCCH candidates at the CCE levels can be allocated to the E-PDCCH region. In this case, how many PDCCH candidates correspond to an SS per CCE level and which PDCCH region (e.g. L-PDCCH or E-PDCCH) is assigned the SS can be preset through RRC signaling. In addition, how many PDCCH candidates correspond to an SS per CCE level and which PDCCH region (e.g. L-PDCCH or E-PDCCH) is assigned the SS per subframe can be preset through RRC signaling. Considering efficient use of resources in a PDSCH region, it may be useful to allocate SSs corresponding to different numbers of PDCCH candidates to the L-PDCCH region and E-PDCCH region according to CCE level. For example, SSs for 4, 4, 1 and 1 PDCCH candidates at respective CCE levels can be allocated to the L-PDCCH region and SSs for 2, 2, 1 and 1 PDCCH candidates can be allocated to the E-PDCCH region.

In addition, for more flexible utilization of CCE resources, the numbers of PDCCH candidates for respective CCE levels can be redistributed (e.g. the numbers of PDCCHs candidates at CCE levels of 1, 2, 4 and 8 are redistributed as 8, 8, 0 and 0) such that the number of PDCCH candidates does not exceed a maximum number of BD operations, and then how many PDCCH candidates correspond to an SS per CCE level and which PDCCH region (e.g. L-PDCCH or E-PDCCH) is assigned the SS can be preset through RRC signaling.

FIG. 13 illustrates an SS distribution and allocation scheme according to the present embodiment. Referring to FIG. 13, PDCCH candidates are divided into two sets and SSs for the two sets are respectively allocated to the L-PDCCH region and the E-PDCCH region. For example, X1,1+X1,2=6, X2,1+X2,2=6, X4,1+X4,2=2 and X8,1+X8,2=2. While the figure shows that PDCCH candidates at all CCE levels are distributed to the L-PDCCH region and the E-PDCCH region, PDCCH candidates (i.e. SSs) may be allocated to both the L-PDCCH region and E-PDCCH region at some CCE levels and PDCCH candidates (i.e. SSs) may be allocated to only the L-PDCCH region or E-PDCCH region at some CCE levels. For example, some of X1,1 to X8,2 can have a value of 0 such as X1,1=6 and X1,2=0. In addition, X1,1, X1,2, X2,1 X2,2, X4,1, X4,2, X8,1 and X8,2 can be set such as X1,1+X1,2=8, X2,1+X2,2=8 and X4,1=X4,2=X8,1=X8,2=0, which is not shown.

Method 3: SS Distribution According to DL/UL Grant DCI Format

According to this method, SSs with respect to DCI formats can be distributed and allocated to an L-PDCCH region and an E-PDCCH region according to usage of the DCI formats (e.g. DL-dedicated, DL/UL-common or UL-dedicated). Accordingly, which DCI format corresponds to an SS and which PDCCH region (e.g. L-PDCCH region or E-PDCCH region) is assigned the SS can be predetermined through RRC signaling. In addition, which DCI format corresponds to an SS and which PDCCH region (e.g. L-PDCCH region or E-PDCCH region) is assigned the SS per subframe can be predetermined through RRC signaling.

In the case of an E-PDCCH that schedules a DL grant, it is possible to schedule a PDSCH including even an RB or RBG region corresponding to the E-PDCCH. In this case, UE can receive DL data (i.e. PDSCH) through a region of a resource allocated for the PDSCH rather than a region in which an E-PDCCH of the UE is detected. In the case of an E-PDCCH that schedules a UL grant, additional signaling may be needed to use an available resource (i.e. resource other than a region in which the E-PDCCH is detected) in an RB or RGB region corresponding to the E-PDCCH for PDSCH scheduling for a different UE. Accordingly, an SS for a DL-dedicated DCI format can be allocated to the E-PDCCH region and an SS for a non-DL-dedicated DCI format (i.e. DL/UL-common or UL-dedicated DCI format) can be allocated to the L-PDCCH region in order to efficiently use a PDSCH region and restrain additional signaling overhead (scheme 1). FIG. 14(a) illustrates scheme 1. In the figure, A, B and C denote the numbers of PDCCH candidates for corresponding DCI formats. The numbers of PDCCH candidates for corresponding DCI formats may depend upon transmission mode.

When DL/UL MU-MIMO (multiple user-multiple input multiple output) based on the DL/UL-dedicated DCI format is assumed, control channel overhead with respect to the DL/UL-dedicated DCI format may be aggravated. In view of this, the SSs for the DL-UL-dedicated DCI format can be allocated to the E-PDCCH region and the SS for the DL/UL-common DCI format can be allocated to the L-PDCCH region (scheme 2). FIG. 14(b) illustrates the scheme 2. In the figure, A, B and C denote the numbers of PDCCH candidates for corresponding DCI formats. The numbers of PDCCH candidates for corresponding DCI formats may depend upon transmission mode.

Alternatively, the SS with respect to each DCI format can be allocated to the L-PDCCH region, an E-PDCCH region in the first slot (referred to as a first slot E-PDCCH region hereinafter) or an E-PDCCH region in the second slot (referred to as a second slot E-PDCCH region hereinafter) according to usage of each DCI format (scheme 3). For example, since the DL/UL-common DCI format is used to schedule important commands such as initial access, RRC reconfiguration, etc. (or to indicate fallback operation), the SS for the DL/UL-common DCI format can be allocated to the L-PDCCH region in order to prevent misalignment between a BS and UE. In addition, the SS for the DL-dedicated DCI format can be allocated to the first slot E-PDCCH region in order to reduce DL data (e.g. PDSCH) reception buffering and processing load of the UE. Furthermore, the SS for the UL-dedicated DCI format can be allocated to the second slot E-PDCCH region in order to prevent ambiguity of DL data reception resources, which can be brought about in the case of corresponding PDCCH detection failure (in the E-PDCCH region).

Accordingly, SS configuration can depend upon a transmission mode set to the UE and DCI format type corresponding thereto. For example, when the UE is set to a transmission mode using only the DL/UL-common DCI format and DL-dedicated DCI format, the SS with respect to the DL/UL-common DCI format can be allocated to the L-PDCCH region, the SS with respect to the DL-dedicated DCI format can be allocated to the first slot E-PDCCH region and no SS can be configured in the second slot E-PDCCH region in the case of scheme 3. Alternatively, when the UE is set to a transmission mode using only the DL/UL-common DCI format and UL-dedicated DCI format, the SS with respect to the DL/UL-common DCI format can be allocated to the L-PDCCH region, the SS with respect to the UL-dedicated DCI format can be allocated to the second slot E-PDCCH region and no SS can be configured in the first slot E-PDCCH region in the case of scheme 3.

Methods 1, 2 and 3 can be normalized as follows. SSs can be distributed and allocated to combinations of L/E-PDCCH regions (e.g. options 1 to 7) according to CCE level (method 1), PDCCH candidate partitioning (method 2) and DCI format (method 3). For example, SSs for different CCE levels/PDCCH candidate partitioning/DCI formats can be distributed and allocated to different PDCCH regions. SS allocation proposed by the present invention can be set UE-specifically and/or independently for each CC. Accordingly, it is possible to distribute PDCCH load for a plurality of UEs and a plurality of CCs more efficiently and flexibly such that unused resources are minimized. In addition, it is possible to achieve more stable and efficient PDCCH transmission in consideration of interference influence in a specific L/E-PDCCH region according to each UE and each CC state.

Option 1) allocation of an SS to the L-PDCCH region only

Option 2) allocation of an SS to the first slot E-PDCH region only

Option 3) allocation of an SS to the second slot E-PDCCH region only

Option 4) distribution and allocation of SSs to the L-PDCCH region and the first slot E-PDCCH region only Option 5) distribution and allocation of SSs to the L-PDCCH region and the second slot E-PDCCH region only Option 6) distribution and allocation of SSs to the first slot E-PDCCH region and the second slot E-PDCCH region only Option 7) distribution and allocation of SSs to all the L-PDCCH region, the first slot E-PDCCH region and the second slot E-PDCCH region In the case of option 5, an SS for a non-UL-dedicated DCI format (i.e. DL/UL-common DCI format or DL-dedicated DCI format) can be allocated to the L-PDCCH region and only the SS for the UL-dedicated DCI format can be allocated to the second slot E-PDCCH region (based on method 3) in consideration of decoding latency for a DL grant PDCCH. In the case of operation 6, the SS for the non-UL-dedicated DCI format (i.e. DL/UL-common DCI format or DL-dedicated DCI format) can be allocated to the first slot E-PDCCH region and only the SS for the UL-dedicated DCI format can be allocated to the second slot E-PDCCH region (based on method 3) in consideration of decoding latency for a DL grant PDCCH.

Some or all of methods 1, 2 and 3 can be combined. For example, at CCE levels of 1 and 2, SSs for 3 PDCCH candidates (CCE level=1) and 3 PDCCH candidates (CCE level=2) can be allocated to the L-PDCCH region and SSs for all the remaining PDCCH candidates can be allocated to the E-PDCCH region. In addition, which combination (CCE level, PDCCH candidate partitioning, DCI format) corresponds to an SS and which PDCCH region (L-PDCCH region or E-PDCCH region) is assigned the SS can be preset through RRC signaling. Furthermore, which combination (CCE level, PDCCH candidate partitioning, DCI format) corresponds to an SS and which PDCCH region (L-PDCCH region or E-PDCCH region) is assigned the SS per subframe can be preset through RRC signaling.

Figure 15:
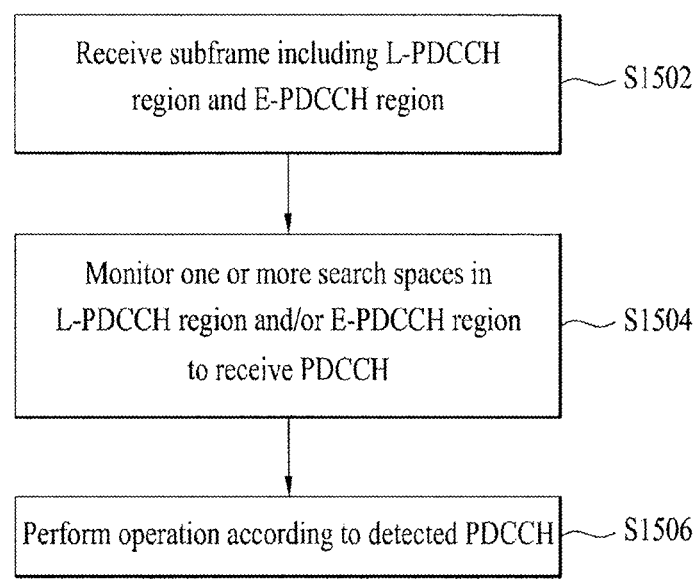
FIG. 15 illustrates an exemplary downlink signal processing method according to an embodiment of the present invention.

FIG. 15 illustrates a downlink signal processing procedure according to an embodiment of the present invention. FIG. 15 shows a procedure performed at UE and an operation corresponding to the procedure can be performed at a BS.

Referring to FIG. 15, the UE can receive a subframe including an L-PDCCH region and an E-PDCCH region (S1502). The L-PDCCH region is configured in a control region of the subframe and the E-PDCCH region is configured in a data region of the subframe (refer to FIG. 4). The number of OFDM symbols used for the L-PDCCH region equals the number of OFDM symbols used for the control region and can be indicated per subframe through a PCFICH. The position of the first OFDM symbol at which the E-PDCCH region starts can be configured using a PCFICH or through RRC signaling. A frequency resource of the E-PDCCH region can be given as an RB set allocated through higher layer signaling (refer to FIG. 11). The UE can monitor one or more SSs in the L-PDCCH region and/or the E-PDCCH region in order to receive a PDCCH (S1504). Monitoring includes blind decoding performed on PDCCH candidates in SSs. When a PDCCH corresponding to the UE is detected, the UE can operate according to the detected PDCCH (S1506). For example, the UE can receive a PDSCH corresponding to the PDCCH or transmit a PUSCH corresponding to the PDCCH. In this example, each SS can be allocated to the L-PDCCH region and/or the E-PDCCH region according to predetermined standards (e.g. methods 1, 2 and 3).

Related Process 1: ACK/NACK Transmission for DL PDSCH Reception

As described in methods 1, 2 and 3, it may be necessary to semi-statically reserve ACK/NACK resources through RRC signaling, considering transmission/detection of a DL grant PDCCH through an SS allocated to the E-PDCCH region (i.e. explicit ACK/NACK resources). In this case, a plurality of ACK/NACK resources can be reserved and ACK/NACK resources that will actually be used can be indicated through the DL grant PDCCH. This is because a CCE is not defined in the E-PDCCH region although an ACK/NACK resource for a PDSCH corresponding to a PDCCH is implicitly inferred from the first CCE index used to transmit the PDCCH according to a conventional ACK/NACK resource allocation method.

Specifically, when a DL grant PDCCH is detected through an SS allocated to the L-PDCCH region, ACK/NACK information about a PDSCH that schedules the PDCCH can be transmitted using a dynamic ACK/NACK resource (i.e. implicit ACK/NACK resource) linked to a CCE index (preferably, the first CCE index) of the PDCCH. Conversely, when the DL grant PDCCH is detected through an SS allocated to the E-PDCCH region, ACK/NACK information about the PDSCH corresponding to the DL grant PDCCH can be transmitted using an explicit ACK/NACK resource.

Related Procedure 2: SS Structure for Cross-CC Scheduling in CA Situation

When cross-CC scheduling is set, a CC (i.e. scheduled CC) can only be DL/UL-scheduled by a specific CC (i.e. scheduling CC). That is, the scheduled CC can receive a DL/UL grant PDCCH therefor from the scheduling CC only. The scheduling CC can perform DL/UL scheduling thereon. Accordingly, SSs for PDCCHs that schedule the scheduling/scheduled CCs are present in a control channel region of the scheduling CC. When cross-CC scheduling is set, the following can be considered for SS distribution.

Cross-CC scheduling operation may be an operation (of UE) suitable for a case in which the control channel region, that is, the L-PDCCH region of the scheduled CC is not suitable for PDCCH transmission due to influence of interference, channel state, etc.

It may not be easy to use an available resource (i.e. resource other than a region in which an E-PDCCH that schedules the scheduled CC on the scheduling CC is detected) in an RB or RBG region including the E-PDCCH to schedule a PDSCH of other UE without additional signaling.

Figure 16:
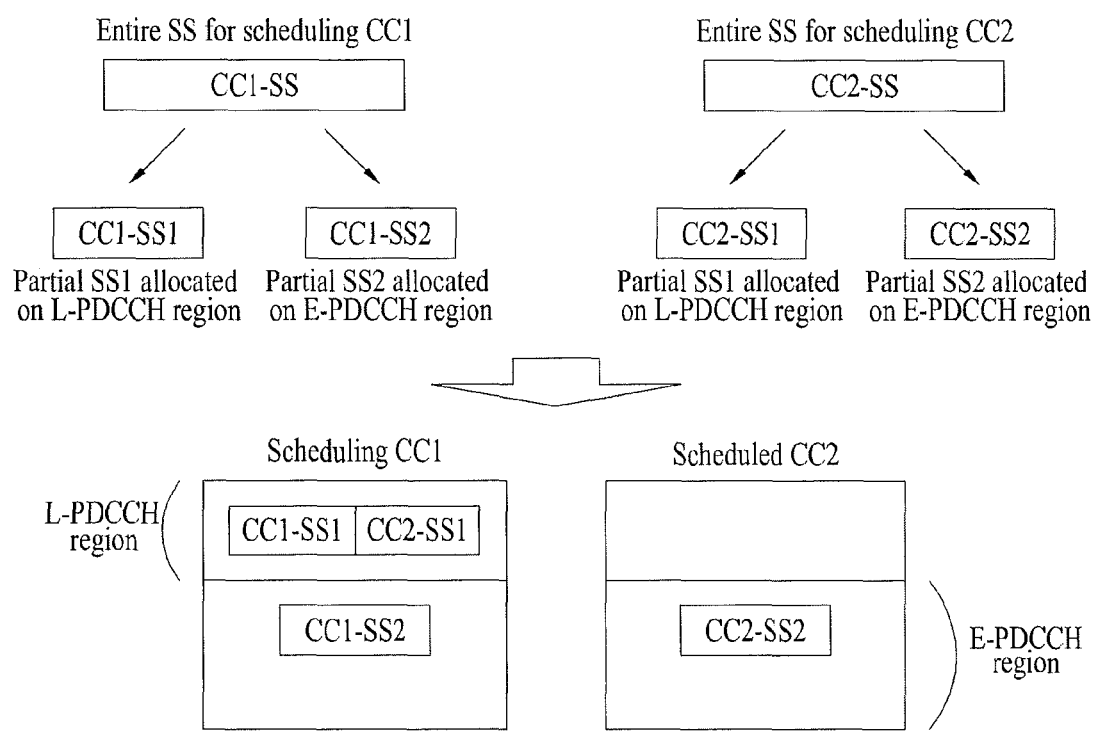
FIGS. 16 and 17 illustrate a search space configuration method according to an embodiment of the present invention.
Figure 17:
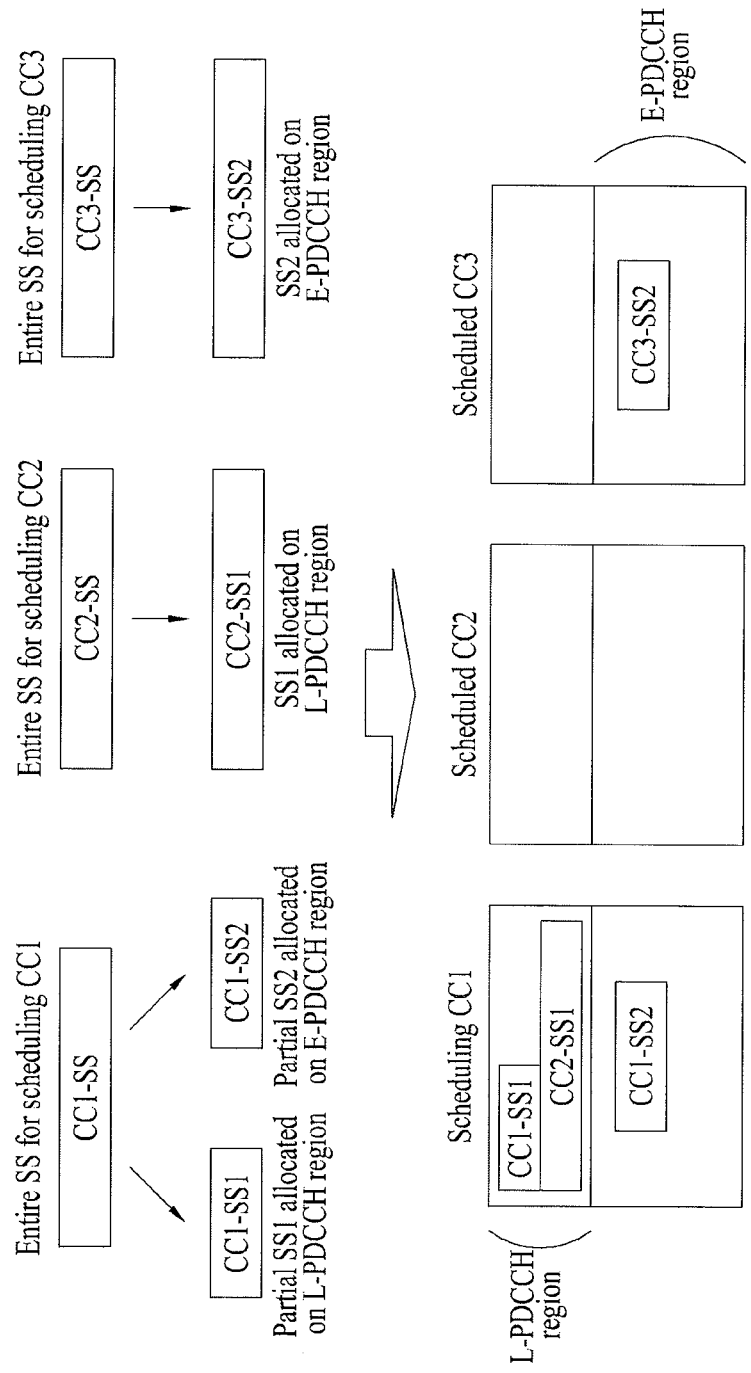

Accordingly, when methods 1, 2 and 3 are applied per CC in the case of CA based cross-CC scheduling, a method of configuring an SS, which needs to be allocated to an L-PDCCH region per CC, in the L-PDCCH region of the scheduling CC and configuring an SS, which needs to be allocated to an E-PDCHC region per CC, in the E-PDCCH region of the corresponding CC can be considered (refer to FIG. 16). Particularly, a DCI format transmitted through the SS allocated to the E-PDCCH region may not include a CIF field (even if cross-CC scheduling is set). In addition, how an SS for each CC is configured (the SS is configured only in the L-PDCCH region, only in the E-PDCCH region or a combination of L/E-PDCCH regions to which the above-described methods are applied) can be independently set per CC through RRC signaling. In this case, an SS, which needs to be allocated to an L-PDCCH region per CC, can be configured in the L-PDCCH region of the scheduling CC and an SS (a DCI format transmitted through the SS may not include a CIF field), which needs to be allocated to an E-PDCCH region per CC, can be configured in the E-PDCCH region of the corresponding CC (refer to FIG. 17).

Figure 18:
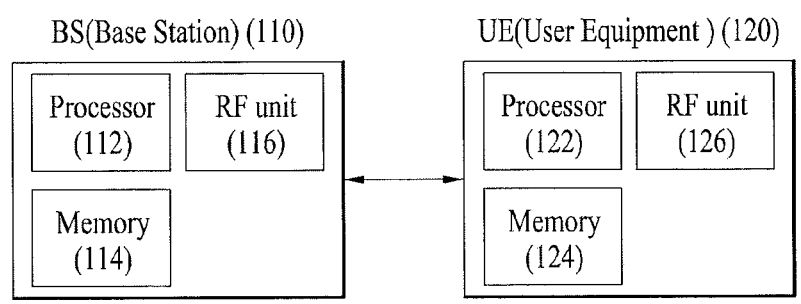
FIG. 18 illustrates a BS and a UE applicable to the present invention.

FIG. 18 illustrates a BS, a relay and UE applicable to embodiments of the present invention.

Referring to FIG. 18, a wireless communication system includes a BS 110 and a UE 120. When the wireless communication system includes a relay, the BS or UE can be replaced by the relay.

The BS includes a processor 112, a memory 114 and an RF unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124, and an RF unit 126. The processor 112 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description has been given centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The present invention is applicable to a UE, a BS or other devices of a wireless mobile communication device. Specifically, the present invention can be applied to a method and apparatus for transmitting uplink control information.

What is claimed is:

1. A method for operating a user equipment (UE) in a wireless communication system, the method comprising:
receiving a subframe including a plurality of orthogonal frequency division multiplexing (OFDM) symbols; and
monitoring a plurality of search spaces configured on the subframe so as to receive control information indicated to the UE,
wherein the plurality of search spaces are allocated in a Physical Downlink Control Channel (PDCCH) region or an Enhanced-PDCCH (E-PDCCH) region, the PDCCH region including one or more consecutive OFDM symbols starting from a first OFDM symbol of the subframe and the E-PDCCH region including one or more consecutive OFDM symbols not overlapped with the PDCCH region in the subframe, and
wherein search spaces corresponding to Control Channel Element (CCE) aggregation levels 4 and 8 among the plurality of search spaces are allocated to the PDCCH region, if the UE is configured for E-PDCCH monitoring in the subframe.

2. The method according to claim 1, wherein search spaces corresponding to CCE aggregation level 1, 2, 4 and 8 among the plurality of search spaces are allocated to the E-PDCCH region, if the UE is configured for E-PDCCH monitoring in the subframe.

3. The method according to claim 1, wherein search spaces corresponding to the CCE aggregation level 1, 2, 4 and 8 are allocated to the PDCCH region, if the UE is not configured for E-PDCCH monitoring in the subframe.

4. The method according to claim 1, wherein the plurality of search spaces are not allocated to the E-PDCCH region, if the UE is not configured for E-PDCCH monitoring in the subframe.

5. The method according to claim 1, wherein the E-PDCCH region is multiplexed with a resource for a downlink shared channel according to frequency division multiplexing (FDM).

6. The method according to claim 1, wherein a basic resource unit of the PDCCH region is a resource element group (REG) and a basic resource unit of the E-PDCCH region is a resource block (RB).

7. A user equipment (UE) for use in a wireless communication system, the TIE comprising:
a radio frequency (RF) unit; and
a processor configured to control the RF unit,
wherein the processor is configured to receive a subframe including a plurality of orthogonal frequency division multiplexing (OFDM) symbols, and to monitor a plurality of search spaces configured on the subframe so as to receive control information indicated to the UE,
wherein the plurality of search spaces are allocated in a Physical Downlink Control Channel (PDCCH) region an Enhanced-PDCCH (E-PDCCH) region the PDCCH region including one or more consecutive OFDM symbols starting from a first OFDM symbol of the subframe and the E-PDCCH region including one or more consecutive OFDM symbols not overlapped with the PDCCH region in the subframe, and wherein search spaces corresponding to Control Channel Element (CCE) aggregation levels 4 and 8 among the plurality of search spaces are allocated to the PDCCH region, if the UE is configured for E-PDCCH monitoring in the subframe.

8. The UE according to claim 7, wherein search spaces corresponding to CCE aggregation level 1, 2, 4 and 8 among the plurality of search spaces are allocated to the E-PDCCH region, if the UE is configured for E-PDCCH monitoring in the subframe.

9. The UE according to claim 7, wherein search spaces corresponding to the CCE aggregation level 1, 2, 4 and 8 are allocated to the PDCCH region, if the UE is not configured for E-PDCCH monitoring in the subframe.

10. The UE according to claim 7, wherein the plurality of search spaces are not allocated to the E-PDCCH region, if the UE is not configured for E-PDCCH monitoring in the subframe.

11. The UE according to claim 7, wherein the E-PDCCH region is multiplexed with a resource for a downlink shared channel according to frequency division multiplexing (FDM).

12. The UE according to claim 7, wherein a basic resource unit of the PDCCH region is a resource element group (REG) and a basic resource unit of the E-PDCCH region is a resource block (RB).

* * * * *